United States Patent [19]

Nelson et al.

[11] Patent Number: 5,199,847
[45] Date of Patent: Apr. 6, 1993

[54] BALLOON INFLATOR WITH INVOLUTE CHAMBER AND BYPASS NOZZLE

[75] Inventors: David C. Nelson, Akron; William E. Bartasevich, Kent; Robert L. Waldo, Southington; Wesley A. Schroeder, Uniontown, all of Ohio

[73] Assignee: Premium Balloon Accessories, Akron, Ohio

[21] Appl. No.: 829,310

[22] Filed: Feb. 3, 1992

[51] Int. Cl.⁵ .................... F04B 35/04; F03B 1/04
[52] U.S. Cl. .................. 415/148; 417/423.14; 417/440; 141/346
[58] Field of Search ............... 417/423.8, 423.14, 440; 415/144, 145, 148; 141/346, 347, 351, 352, 383

[56] References Cited

U.S. PATENT DOCUMENTS

| | | | |
|---|---|---|---|
| 3,563,676 | 2/1971 | Coovert | 417/410 |
| 4,767,286 | 8/1988 | Kohl | 417/423.8 |
| 4,921,402 | 5/1990 | Nelson | 415/148 |

FOREIGN PATENT DOCUMENTS 505227 12/1952 Belgium ................. 417/423.8

Primary Examiner—Richard A. Bertsch
Assistant Examiner—Roland McAndrews
Attorney, Agent, or Firm—Renner, Kenner, Greive, Bobak, Taylor & Weber

[57] ABSTRACT

A balloon inflator utilizes a bypass motor such that the inflation or working air is separate from the motor cooling air. The intake for the motor cooling and inflation air is separated from exhaust vents to limit any recirculation of the air, assuring that the inflation air be maintained as cool as possible. An impaler is maintained in an involute to achieve the requisiting inflation pressure. A free floating inflation nozzle is maintained within a collar and is adapted for engagement with an output of the involute when inflation activity is desired; otherwise the nozzle is disengaged from the involute allowing the air from the involute to otherwise be exhausted. The motor driving the impaler is selectively interconnected with a half wave rectifier for speed selectability.

7 Claims, 2 Drawing Sheets

BALLOON INFLATOR WITH INVOLUTE CHAMBER AND BYPASS NOZZLE

TECHNICAL FIELD

The invention herein resides in the art of inflation devices and, more particularly, to an inflator for balloons of various types and sizes. Specifically, the invention relates to a balloon inflator which incorporates a bypass motor having separate working air and motor cooling air paths. The invention further relates to a balloon inflator which is of variable speed and which exhausts the working air when not engaged with a balloon for inflation.

BACKGROUND ART

Various types of balloon inflators have previously been known. Typically, such inflators incorporate a through-flow motor which draws air from the surrounding atmosphere and exhausts it through an air duct adapted to receive the neck of a balloon. Accordingly, the air used for inflating the balloon is the same air that was drawn through the motor to cool it. As the motor works, its temperature rises. This is aggravated by the use of narrow nozzles at the outlet of the inflator to receive the balloon neck. The narrow nozzle restricts the air flow and accordingly raises the motor temperature. This is particularly true when a large number of balloons are being inflated in succession, for each balloon constitutes a motor load which varies as the balloon inflates. As a result, the motors of such inflators are given to quick wear-out after operating at continuously high temperatures.

Aggravating this problem further, as the temperature of the motor rises, the balloons are inflated with increasingly warmer air. After the balloon is inflated and the neck sealed, the balloon appears to deflate as the warm air cools and contracts. In the case of Mylar balloons, the balloons become wrinkled and soft-looking in appearance. Further, with Mylar balloons, when the balloon has hit its maximum expansion, the air flow substantially terminates. When the balloon is removed, the small orifice nozzle used for inflating the balloon does not allow the air flow to increase significantly to lower the temperature. There has previously been provided in the art an inflator for passing air through a narrow nozzle to the balloon during the inflating process, and subsequently passing the air through a larger opening or orifice, bypassing the nozzle, to increase through flow of the motor and lower its temperature after the inflating process. Such an inflator is taught by U.S. Pat. No. 4,921,402 which establishes the state of the art of balloon inflators at this point in time. However, the balloon inflator taught by this prior patent also employs a through-flow motor which, while constituting a vast improvement over its prior art, still results in an increase in balloon air temperature and resulting disfigurement of the balloon upon cooling.

The prior art has also been generally devoid of a balloon inflator which is operative at various speeds or at various pressure levels to accommodate both latex and Mylar balloons. This prior art has also been generally devoid of a quiet operating balloon inflator, operating at reduced noise levels.

DISCLOSURE OF INVENTION

In light of the foregoing, it is a first aspect of the invention to provide a balloon inflator which is adapted for continuous operation, providing air to a balloon through a restricted exhaust nozzle during the inflating process and having a by-pass path for exhausting air when not inflating.

Another aspect of the invention is the provision of a balloon inflator which incorporates a bypass motor, rather than a through flow motor, such that the working air and motor cooling air paths are maintained separate and apart.

A further aspect of the invention is the provision of a balloon inflator having an involute which, by its design, serves to increase the discharge air pressure such that it will inflate a wider variety of balloon types than previous inflators.

Yet another aspect of the invention is the provision of a balloon inflator which is quiet in operation as compared to prior art devices.

Still a further aspect of the invention is the provision of a balloon inflator which is rapid in operation, capable of quickly inflating balloons of various natures and sizes.

Yet an additional aspect of the invention is the provision of a balloon inflator which has selectable inflation speeds.

Still an additional aspect of the invention is the provision of a balloon inflator which is reliable and durable in operation, while being easy to operate and maintain.

The foregoing and other aspects of the invention which will become apparent as the detailed description proceeds are achieved by a balloon inflator, comprising: a motor; an impeller driven by said motor, said impeller being received within a chamber; and a nozzle movable between engagement with an outlet of said chamber to direct air from said chamber out of said nozzle and disengagement with said outlet to allow air from said chamber to bypass said nozzle.

Yet additional aspects of the invention which will become apparent herein are attained by a balloon inflator, comprising: a housing; a motor received within said housing; an impeller received within a chamber within said housing, said chamber having an output; and a nozzle slidingly received by said housing in selective communication with said output of said chamber.

BRIEF DESCRIPTION OF DRAWINGS

For a complete understanding of the objects, techniques and structure of the invention, reference should be made to the following detailed description and accompanying drawings wherein.

BEST MODE FOR CARRYING OUT THE INVENTION

Figure 2:
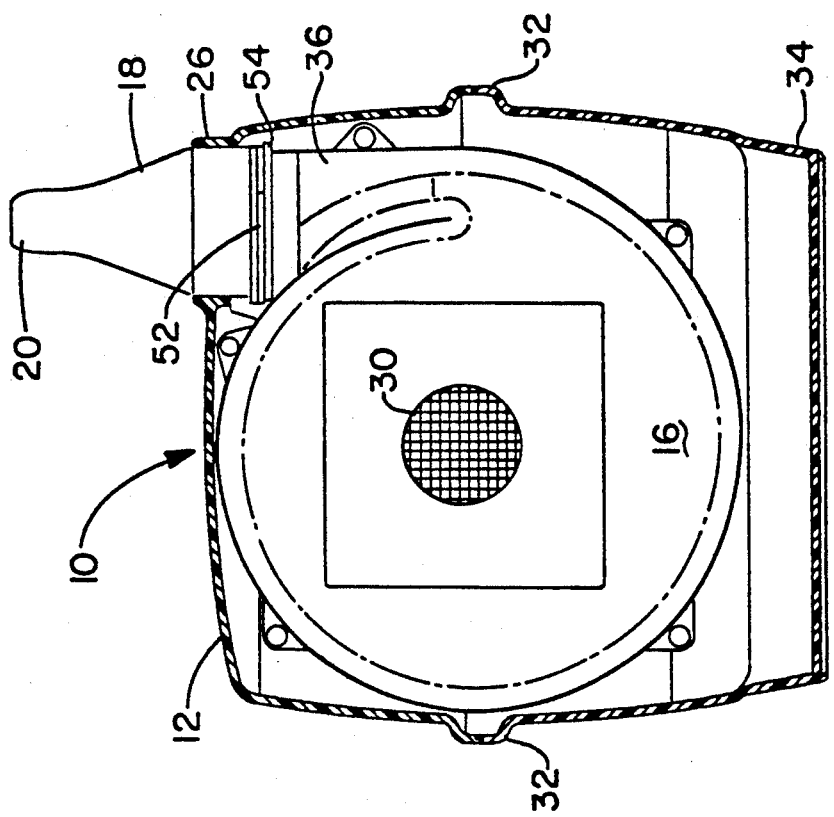
FIG. 2 is a partial sectional view of the inflator of FIG. 1, exposing the involute and nozzle structure thereof and showing the nozzle in an inflating position.
Figure 1:
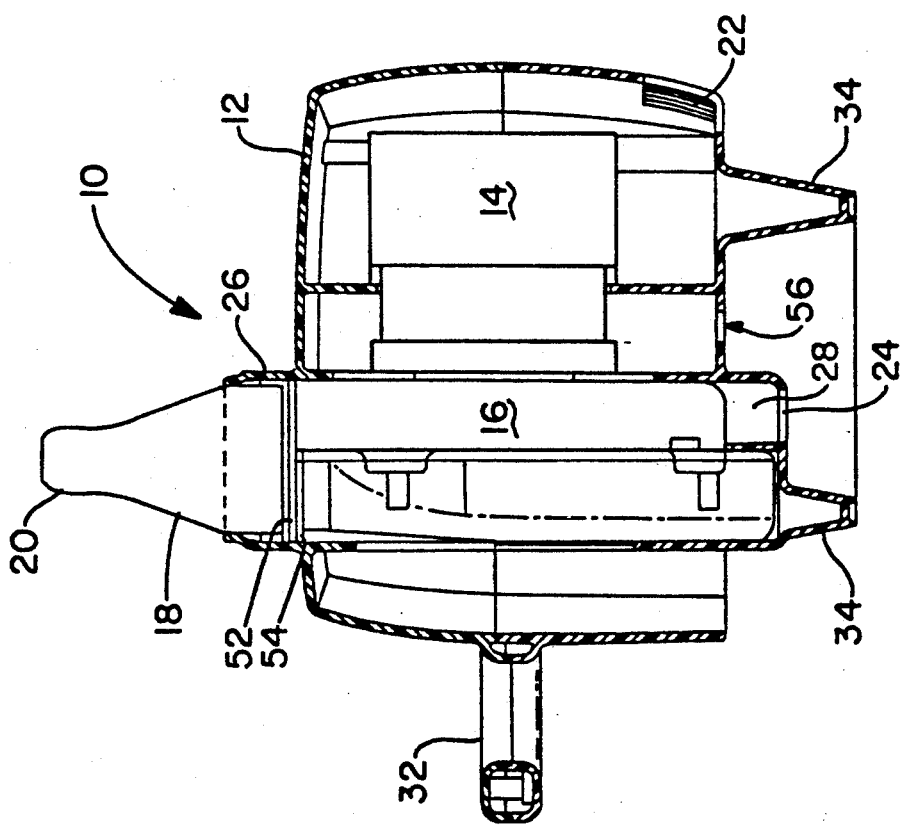
FIG. 1 is a cross sectional view of a balloon inflator according to the invention.

Referring now to the drawings and more particularly FIG. 1, it can be seen that a balloon inflator according to the invention is designated generally by the numeral 10. As shown, the inflator 10 comprises a housing 12 which may be of any suitable material and construction, but which is preferably a molded plastic housing defining a cavity for receiving and maintaining a motor 14 therein. The motor 14 communicates with a fan chamber 16 having an appropriate fan maintained therein. The fan in the fan chamber 16 generates the working air of the balloon inflator 10, the same being communicated from the fan chamber 16 to the inflation nozzle 18. As shown in FIG. 2, the air drawn into the fan chamber 16 by means of the fan passes through the intake opening 30 so as to be passed from the chamber 16, through the horn 36, to the inflator nozzle 18, and out of the orifice 20. As shown in FIG. 2, the fan chamber 16 is provided in the form of an involute to achieve desired air velocity and pressure to the nozzle 18 for introduction into a balloon received thereover and in communication with the orifice 20.

With continuing reference to FIG. 1, it can be seen that an intake vent 22 is provided for communication with the interior of the housing 12 receiving the motor 14. Accordingly, the vent 22 provides a means for drawing motor cooling air into the housing 12 and through the windings of the motor 14 to cool the same. For this purpose, a motor cooling fan or the like would be provided with the motor 14, as is standard with by-pass motors of the type implemented herein. The motor cooling air is exhausted out of the exhaust vent 56 after passing through the motor 14.

Figure 3:
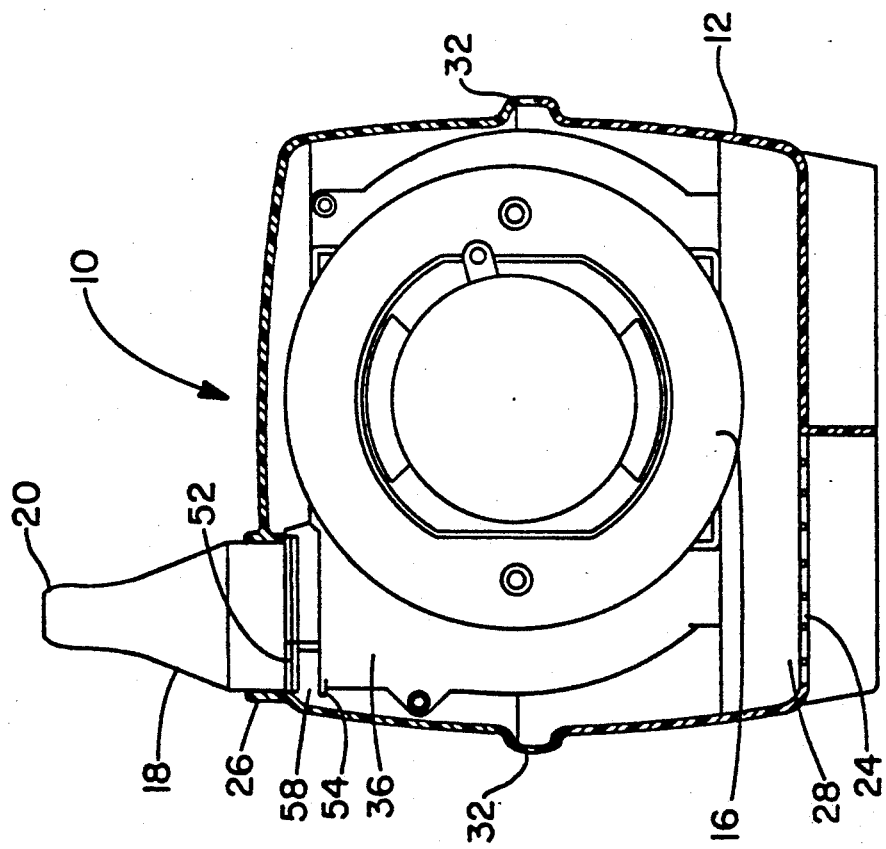
FIG. 3 is a partial sectional view of the inflator of FIG. 1 taken from a side opposite that of FIG. 2, exposing the involute and nozzle structure thereof and showing the nozzle in a bypass position.

As further shown in FIG. 1-3, the nozzle 18 is slidably received by a collar 26 such that the inflator nozzle 18 effectively floats therein. A flange 52 encircles the perimeter of an end of the nozzle 18 received with the housing 12. With the flange 52 having a diameter greater than the inside diameter of the collar 26, the nozzle 18 is precluded from leaving the collar 26. The flange 52 is adapted to sealingly engage the lip 54 encircling the open end of the horn 36 of the involute of the fan chamber 16. Accordingly, the nozzle 18 may move within the collar 26 from a position of seal between the flange 52 and lip 54 as shown in FIG. 2 to a position of separation to expose an opening 58 therebetween as shown in FIG. 3. With the motor 14 energized, and the fan within the chamber 16 rotating, air is drawn in through the intake 30, into the involute fan chamber 16, through the horn 36, and to the nozzle 18. The air pressure so developed urges the nozzle 18 upwardly within the collar 26 so as to expose opening 58 to provide a bypass for the air path from exiting the orifice 20. Effectively, with the nozzle 18 lifted by the air pressure generated from the involute 16, a first portion of the air passing through the horn 36 is emitted from the orifice 20, while the remainder bypasses the orifice 20 through the opening 58, passes through the channel 28 of the cavity of the housing 12 and exits the exhaust vent 24.

When a balloon is to be inflated, the neck of the balloon is inserted over the nozzle 18 to encompass the orifice 20 and the nozzle 18 is depressed so that the flange 52 totally seals against the lip 54 at the outlet of the horn 36, blocking and preventing any bypassing of air from the horn 36 and through the exhaust vent 24. Accordingly, all of the air from the involute 16 is thus introduced through the nozzle 18 and into the interior of the balloon to inflate the same.

It should now be readily appreciated by those skilled in the art that only ambient air drawn through the intake 30 and into the involute 16 is introduced into the interior of a balloon received upon the intake nozzle 18. No motor cooling air is allowed to enter the balloon. By selecting the motor 14 to be a bypass motor, keeping the motor cooling air and working air separated, only air of ambient temperature is introduced into the interior of the balloon, such that the risk of shrinking upon cooling is significantly reduced. Further, operation of the nozzle 18 to seal or expose the bypass openings is achieved without the need for any springs or the like for biasing as in the prior art.

It will also be appreciated by those skilled in the art that by providing the opening 58 in association with the nozzle 18 to significantly increase the cross sectional exhaust from the horn 36 when a balloon is not being inflated, the noise incident to the emitted air is substantially reduced and the inflator runs much quieter than otherwise. When the balloon is fitted over the nozzle 18 and orifice 20, with the nozzle 18 depressed to seat and block the bypassing of exhaust air from the horn 36, all of the air is emitted through the orifice 20 and into the balloon received thereby, but the balloon serves as a muffler to quiet the exhausting air. Accordingly, in both the inflation and idling periods of operation of the balloon inflator 10, the assembly runs quietly.

Those skilled in the art will also appreciate that the bypass nature of the motor 14, separating the working air and motor cooling air, greatly reduces the operating temperature of the motor. Similarly, separation of the intake 22 from the exhaust vents 24, 56 also reduces the operating temperature. Accordingly, the inflator 10 may run continuously without the excessive heat buildup characteristic of inflators using standard through flow motors. Such prior inflators typically required cool down times of 10-15 minutes for every 20-25 minutes of use, such a duty cycle being ineffective and a waste of costly inflation time. The inflator 10 improves usage efficiency over the prior art and allows continuous motor use without excessive heat buildup.

It will also be appreciated that an important feature of the instant invention is the provision of the fan chamber 16 in the form of an involute. Those skilled in the art will understand that as the air decelerates from the impeller, it trades velocity for air pressure. Such a trade-off in an involute is extremely efficient. As the air passes through the chamber 16, it passes to areas of increasing cross sectional area such that the velocity of air decreases while the air pressure increases. Accordingly, an optimum air pressure is achieved at the nozzle 18 and orifice 20. Consequently, motor size can be minimized, along with incident noise, without adversely impacting the effectiveness or efficiency of the balloon inflator 10.

Figure 4:
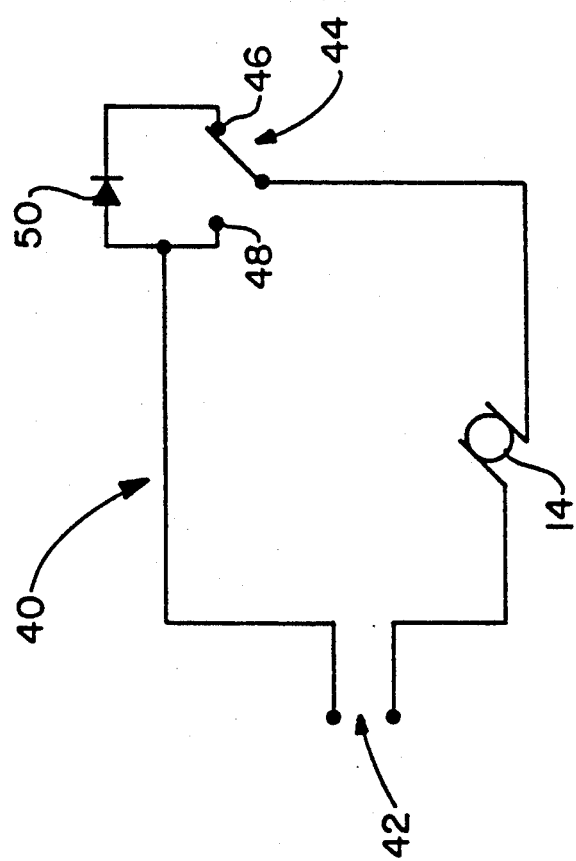
FIG. 4 is a schematic diagram of the control circuit of the balloon inflator.

An important feature of the instant invention is the provision of means for providing for various levels of operation, allowing for the selection of different air pressures for various balloons to be inflated. Those skilled in the art will appreciate that smaller latex balloons may be inflated at a lower pressure or speed than larger latex balloons. Similarly, the inflation of Mylar balloons may also demand selectively of pressure and time. Accordingly, the speed of the motor 14 is appropriately controlled by the circuit 40 shown in FIG. 4. As illustrated, the motor 14 is connected to an AC line voltage 42 in standard fashion. However, a switch 44 is interposed between the motor 14 and one of the lines of the line voltage 42. A diode 50 interconnects contacts 46, 48 of the switch 44 such that the switch 44 may be actuated to place the diode 50 into operation of the circuit 40 or to exclude it therefrom. In the position of the switch 44 shown in FIG. 4, the diode 50 is operative within the circuit 40 and serves as a half wave rectifier to block half cycles of the incoming line voltage 42, to accordingly reduce the operating speed of the motor 14 and, accordingly, the air pressure from the nozzle 18 which is generated in the fan chamber 16. When the switch 44 is actuated to engage the contact 48, the diode 50 is effectively removed from the circuit 40 and full line voltage is applied to the motor 14 which then operates at full speed, introducing maximum pressure to the nozzle 18. Accordingly, the circuit 40 allows the selection of high and low speeds or high and low pressures at which the balloon inflator 10 will operate.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. A balloon inflator, comprising:
   a housing;
   a motor received within said housing;
   a fan chamber within said housing, said fan chamber having an output; and
   a nozzle slidingly received by said housing in selective communication with said output of said fan chamber, said nozzle being received within a collar in said housing, said nozzle having a flange adapted for sealing engagement with a lip on said output of said impeller.

2. The balloon inflator according to claim 1, wherein said flange prevents said nozzle from removal from said collar.

3. The balloon inflator according to claim 2, wherein said fan chamber comprises an involute.

4. The balloon inflator according to claim 3, further comprising a half wave rectifier selectively interposed between said motor and a line voltage.

5. A balloon inflator, comprising:
   a bypass motor;
   an involute fan chamber adjacent said motor; and
   a nozzle movable between engagement with an outlet of said fan chamber to direct air from said fan chamber out of said nozzle and disengagement with said outlet to allow air from said fan chamber to bypass said nozzle, said nozzle having an end slidingly received within a collar of a housing receiving said motor and fan chamber, said end of said nozzle having a flange about a periphery thereof, said flange positioned for selectable sealing engagement with a lip about a periphery of said outlet of said fan chamber.

6. The balloon inflator according to claim 1, further comprising a control circuit means connected to said motor for selecting an operational speed of said motor and a corresponding operational speed of said impeller.

7. The balloon inflator according to claim 6, wherein said circuit means comprises a switch interposed between said motor and a half wave rectifier circuit.

* * * * *